US010730375B2

(12) United States Patent
Ma (10) Patent No.: US 10,730,375 B2
(45) Date of Patent: Aug. 4, 2020

(54) TONNEAU COVER (71) Applicant: Winbo-Dongjian Automotive Technology Co. Ltd., Foshan (CN)

(72) Inventor: Yongtao Ma, Foshan (CN)

(73) Assignee: Winbo-Dongjian Automotive Technology Co. Ltd., Foshan (CN)

( * ) Notice: Subject to any disclaimer, the term of this patent is extended or adjusted under 35 U.S.C. 154(b) by 62 days.

(21) Appl. No.: 15/927,737

(22) Filed: Mar. 21, 2018

(65) Prior Publication Data

US 2019/0291550 A1 Sep. 26, 2019

(51) Int. Cl.
*B60J 7/14* (2006.01)
*B60P 7/02* (2006.01)

(52) U.S. Cl.
CPC .............. *B60J 7/141* (2013.01); *B60P 7/02* (2013.01)

(58) Field of Classification Search
CPC .................................. B60J 7/141; B60P 7/02
USPC ...................................... 296/100.08, 100.09
See application file for complete search history.

(56) References Cited

U.S. PATENT DOCUMENTS

| 5,636,893 | A | 6/1997 | Wheatley et al. | |
|---|---|---|---|---|
| 5,782,282 | A * | 7/1998 | Chen | E05D 3/12 16/250 |
| 6,059,350 | A | 5/2000 | Kooiker | |
| 6,170,900 | B1 | 1/2001 | Kooiker | |
| 6,227,602 | B1 | 5/2001 | Bogard | |
| 6,422,635 | B1 | 7/2002 | Steffens et al. | |
| 7,021,693 | B2 | 4/2006 | Keller | |
| 7,484,788 | B2 | 2/2009 | Calder et al. | |
| 8,061,758 | B2 | 11/2011 | Maimin et al. | |
| 8,348,328 | B2 | 1/2013 | Walser et al. | |
| 8,585,120 | B2 | 11/2013 | Rusher et al. | |
| 9,004,571 | B1 * | 4/2015 | Bernardo | B60J 7/141 296/100.03 |
| 9,039,066 | B1 | 5/2015 | Yue | |
| 9,211,834 | B2 * | 12/2015 | Facchinello | B60P 7/02 |
| 9,421,850 | B2 | 8/2016 | Shi et al. | |
| 9,421,851 | B2 * | 8/2016 | Kerr, III | B60J 7/198 |
| 9,482,039 | B1 | 11/2016 | Xu | |
| 9,555,735 | B2 * | 1/2017 | Kerr, III | B60P 7/02 |
| 9,643,479 | B1 | 5/2017 | Zheng et al. | |
| 9,895,964 | B1 * | 2/2018 | Hickey | B60J 7/041 |
| 9,925,853 | B2 * | 3/2018 | Aubrey | B60R 5/045 |
| 10,189,339 | B2 * | 1/2019 | Williamson | B60J 10/90 |
| 10,245,928 | B1 * | 4/2019 | Facchinello | E05D 7/04 |
| 10,328,778 | B2 * | 6/2019 | Aubrey | B60R 5/045 |

(Continued)

*Primary Examiner* — Gregory A Blankenship
(74) *Attorney, Agent, or Firm* — Eric J. Sosenko; Jonathan P. O'Brien; Honigman LLP (57) ABSTRACT

A tonneau cover for a pickup truck. The tonneau cover includes a first panel, a second panel and hinge assembly pivotally connecting the two panels. The hinge assembly has first and second pivot members fixed to respective edges of the panels. The pivot members including a cylindrical portion within which a pivot pin is received. The hinge assembly also includes a base member positioned between the two pivot members. The base member is connected to the pivot pins so as to be pivotally moveable relative to the two pivot members. With this construction, the base member is pivotable relative to the second pivot member, and the first pivot member and first panel are pivotable relative to the base member so that the first panel is foldable into a position where the first panel overlies the second panel.

18 Claims, 6 Drawing Sheets

(56) References Cited

U.S. PATENT DOCUMENTS

| | | | |
|---|---|---|---|
| 10,328,780 B2* | 6/2019 | DeLong | B60J 7/198 |
| 2007/0035151 A1* | 2/2007 | Rusu | B60J 7/1621 |
| | | | 296/100.01 |
| 2008/0100088 A1* | 5/2008 | Calder | B60J 7/141 |
| | | | 296/100.09 |
| 2013/0341960 A1* | 12/2013 | Garska | B23P 11/00 |
| | | | 296/100.18 |
| 2015/0061315 A1* | 3/2015 | Facchinello | B60P 7/02 |
| | | | 296/100.07 |
| 2016/0031305 A1* | 2/2016 | Bernardo | B60J 7/085 |
| | | | 296/100.03 |
| 2017/0240033 A1* | 8/2017 | Dylewski, II | B60J 7/141 |
| 2019/0105975 A1* | 4/2019 | Yilma | B60J 7/141 |

* cited by examiner

TONNEAU COVER

BACKGROUND

1. Field of the Invention

The present invention generally relates to tonneau covers. More specifically, the invention relates to tonneau covers for selectively closing the cargo box of a pickup truck.

2. Description of Related Art

Tonneau covers are well known for covering the cargo boxes of pickup trucks to protect the contents of the cargo box from environmental factors and to enhance the aesthetics of the pickup truck. Generally, tonneau covers are movable so as to selectively close off or provide access to the cargo box without requiring complete removal of the tonneau cover. In this regard, the tonneau covers are typically of the roll-up variety or the foldable variety.

Regarding the foldable variety, these tonneau covers typically include a frame disposed about the upper surfaces of the side and end rails of the cargo box with transverse rails extending between the side rails. One or more hinged connections are provided in the frame to allow the frame to fold upon itself. This folding may be in multiple directions, but is typically in the direction toward the cab of the pickup truck.

To cover the open areas between the various frame members, the tonneau cover may be provided with a flexible cover extending over the entire frame. This is generally known as a soft-top tonneau cover. Alternatively, the tonneau cover may be provided with individual rigid panels between the various frame members. This is often referred to as a hardtop tonneau cover. Because of increased weight, the hinge assemblies used in connection with hardtop tonneau covers must be more robust. Additionally, providing for adequate sealing at the hinge assemblies and between adjacent hard panels becomes a concern.

SUMMARY

In satisfying the above need, as well as overcoming the enumerated drawbacks and other limitations of the related art, the present invention provides a tonneau cover for a pickup truck.

Accordingly, in an aspect of the invention a tonneau cover is provided having a first panel, a second panel and hinge assembly pivotally connecting the two panels. The hinge assembly has first and second pivot members fixed to respective edges of the panels. The pivot members including a cylindrical portion within which a pivot pin is received. The hinge assembly also includes a base member positioned between the two pivot members. The base member is connected to the pivot pins so as to be pivotally moveable relative to the two pivot members. With this construction, the base member is pivotable relative to the second pivot member, and the first pivot member and first panel are pivotable relative to the base member so that the first panel is foldable into a position where the first panel overlies the second panel.

According to another aspect, the first and second pivot pins extend from respective ends the first and second cylindrical portions.

In a further aspect, the first and second pivot pins respectively extend a full length of the respective ends of the first and second panels.

As an additional aspect, the base member is connected to the first and second pivot pins at a common end of the base member.

In still another aspect, the base member is fixedly connected to the first and second pivot pins.

In yet a further aspect, the first and second pivot pins are rotatably received in the first and second cylindrical portions.

According to an additional aspect, an end cap connecting the base member to both the first and second pivot pins.

In another aspect, the end cap is fixedly engaged to the base member.

In still a further aspect, the end cap is fixedly engaged to the first and second pins.

In yet an additional aspect, the first and second panels are rigid.

In a still another aspect, the tonneau cover includes a third panel and a second hinge assembly, the second hinge assembly pivotally connecting the third panel to the second panel.

According to a further aspect, the second hinge assembly includes a third pivot member fixed to an edge of the second panel, the third pivot member including a third cylindrical portion within which a third pivot pin is received; a fourth pivot member fixed to an edge of the third panel, the fourth pivot member including a fourth cylindrical portion within which a fourth pivot pin is received; and a second base member positioned between the third and fourth pivot members, the second base member being connected to the third and fourth pivot pins so as to be pivotally moveable relative to the third and fourth pivot members; and whereby the second base member is pivotable relative to the fourth pivot member and the third pivot member and second panel are pivotable relative to the second base member such that the first and second panels are foldable into a position where the first and second panels overlie the third panel.

In another aspect the invention a tonneau cover is provided for selectively enclosing a cargo box of a pickup truck, the tonneau cover including: a first panel, a second panel and a hinge assembly, the hinge assembly pivotally connecting the first panel to the second panel, the hinge assembly including a first pivot member fixed to the first panel, a second pivot member fixed to the second panel, a base member positioned between the first and second pivot members and being pivotally moveable relative to the first and second pivot members, the base member being pivotally connected to at least one of the first and second pivot members by a pivot connection, the pivot connection including a cylindrical portion, a pivot pin received internally of the cylindrical portion and an end cap connected to the pivot pin, the cylindrical portion being integral with of one of the base member and the first or second pivot members, and the end cap being fixedly connected to the other of the base member and the first or second pivot members; and whereby the base member is pivotable relative to the second pivot member and the first pivot member and first panel are pivotable relative to the base member such that the first panel is foldable into a position where the first panel overlies the second panel.

In a further aspect, the pivot pin is fixedly connected to the end cap.

In an additional aspect, the cylindrical portion is unitarily formed with one of the base member and the first or second pivot members.

In still another aspect, the pivot connection includes a second cylindrical portion, a second pivot pin received internally of the second cylindrical portion, the second pivot pin being connected to the end cap.

In yet a further aspect, the second cylindrical portion is integral with of one of the base member and the other of the first or second pivot members.

In an additional aspect, the second cylindrical portion is unitary with of one of the base member and the other of the first or second pivot members.

In still a further aspect, the second pivot pin is fixedly connected to the end cap.

Further objects, features and advantages of this invention will become readily apparent to persons skilled in the art after review of the following description, with reference to the drawings and the claims that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left," "right," "front," and "rear" are similarly interpreted. The terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
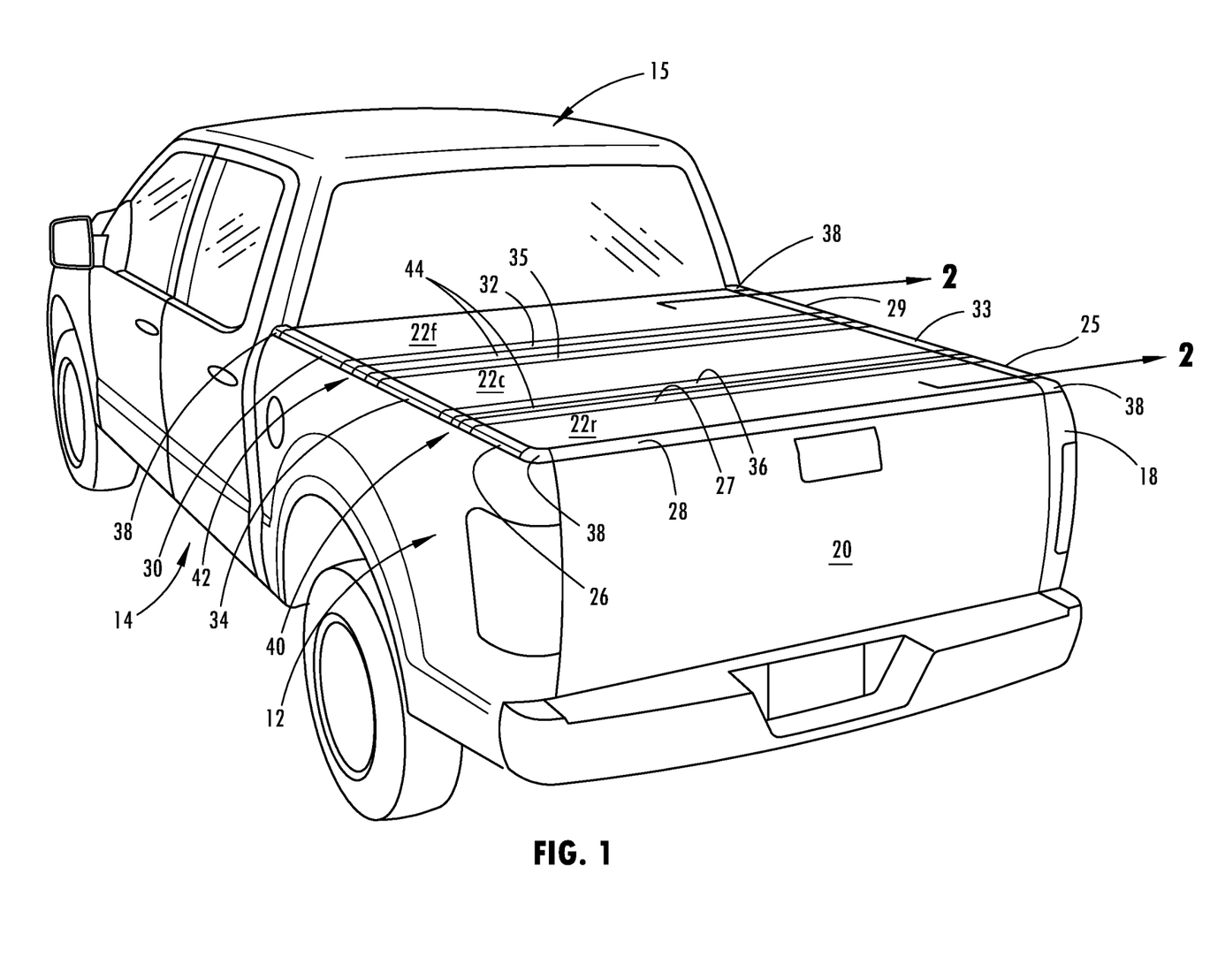
FIG. 1 is a perspective view of a pickup truck with tonneau cover embodying the principles of the present invention over the bed or cargo box of the pickup truck.

Referring now to the drawings, a tonneau cover, and more particularly a folding tonneau cover, is shown therein and designated at 10. The tonneau cover 10 is typically used to cover the bed or cargo box 12 of a pickup truck 14. As seen in FIG. 1, the tonneau cover 10 is disposed on the upper surfaces 16 of the sidewalls 18, including the tailgate 20, that define the cargo box 12 of the pickup truck 14.

Figure 2:
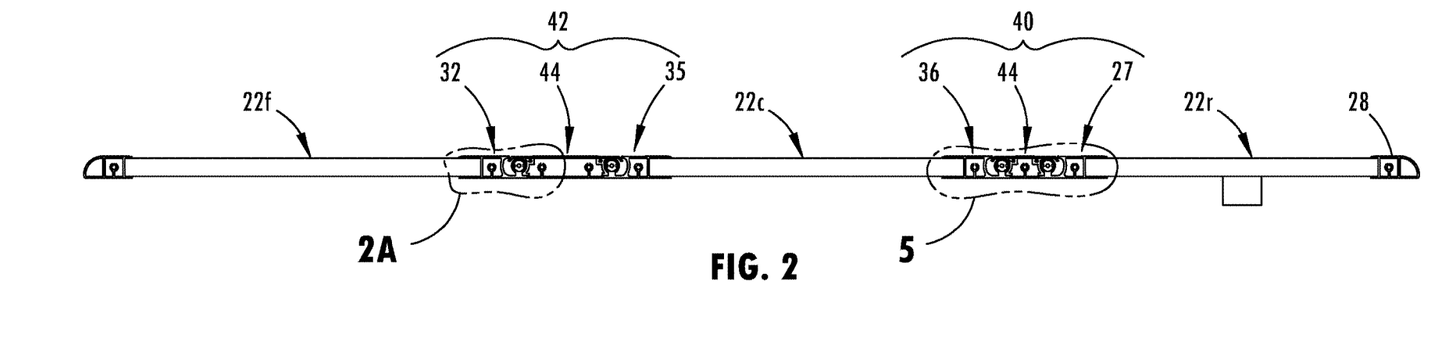
FIG. 2 is a longitudinal sectional view of the tonneau cover seen in FIG. 1 in a fully unfolded position.
Figures 3, 3A:
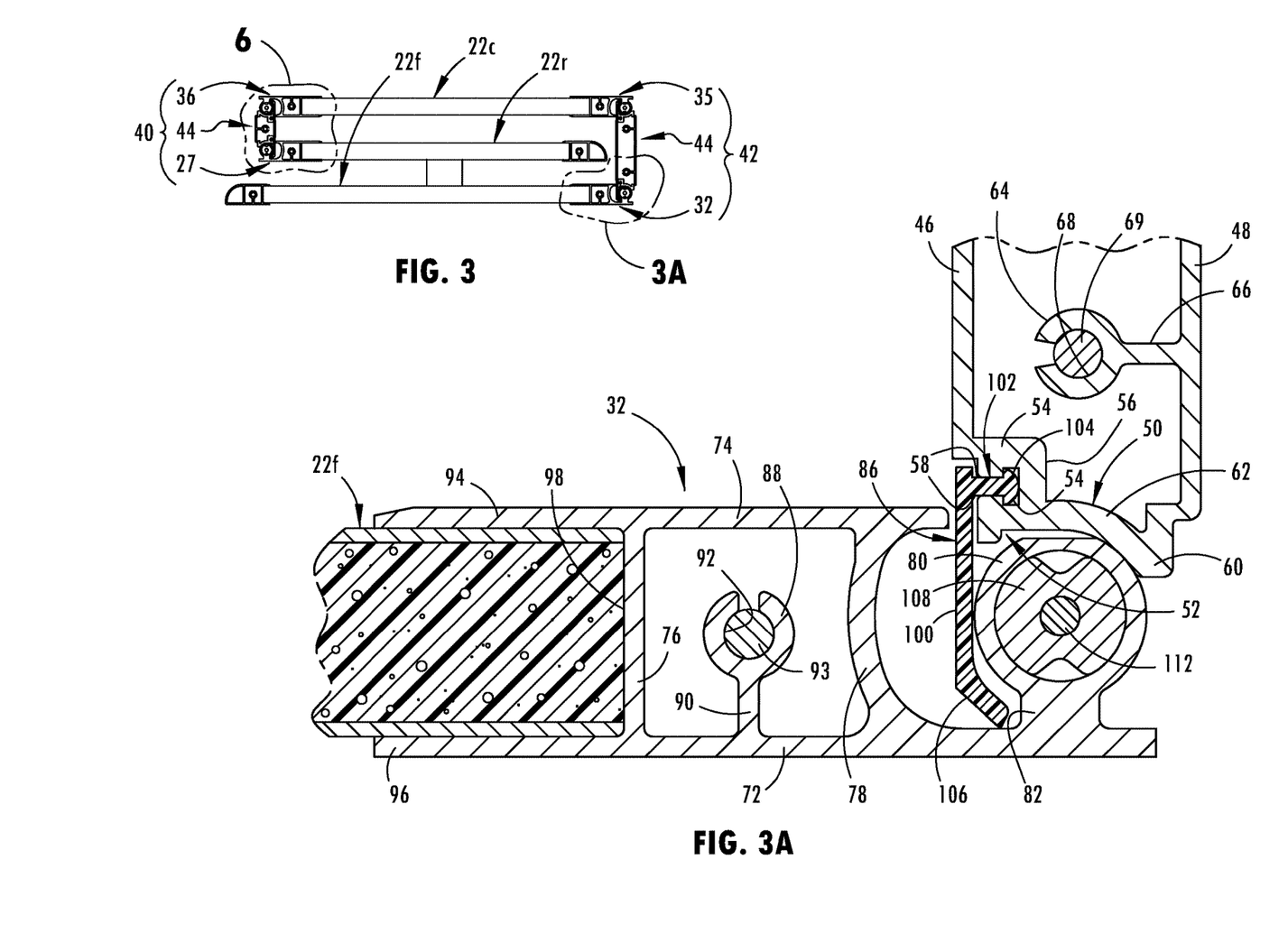
FIG. 3 is a longitudinal sectional view of the tonneau cover seen in FIG. 2 in a fully folded position.
FIG. 3A is an enlarged partial view of part of the hinge assembly, in the folded position, generally encircled at 3A in FIG. 3.

The tonneau cover 10 includes a plurality of individual panels 22, each of which has a substantially rectangular configuration. As illustrated, the tonneau cover 10 is a tri-fold tonneau cover, meaning that it is comprised of three panels 22 that are foldable over one another so as to selectively cover some or substantially all of the cargo box 12. As referred to herein, panel 22r is the first, rear or tailgate-end panel; panel 22c is the second, center or middle panel; and panel 22f is the third, front or cab-end panel of the tonneau cover 10. The tonneau cover 10, as seen in FIGS. 1 and 2, is in its fully open or unfolded position and fully or substantially covers the opening of the cargo box 12. FIG. 3 illustrates the tonneau cover 10 in its fully folded position, which would only partially cover the opening of the cargo box 12 at a location adjacent to the cab 15 of the pickup truck 14.

As noted above, the panels 22 are rigid structures and, accordingly, may be formed in a variety of techniques, well known to those skilled in this technological field, so as to define a composite structure. For example, the panels 22 may be comprised of solid upper and lower sheets of aluminum, between which a core of an extruded polystyrene foam sheet is provided. Since the particular construction of the panels 22 will vary based on the individual preferences of the manufacturer and the particular design criteria for the tonneau cover, further details regarding the specific construction of the panels 22 themselves is not provided herein.

Each panel 22 is bounded about its perimeter by a series of frame members. For the rear panel 22r, the frame members includes a rear-right frame member 25, a rear-left frame member 26, a rear-front frame member 27 and a rear-rear frame member 28. The rear-right, rear-left, and rear-rear frame members 25, 26, 28 may be identical in cross-sectional shape and provide the rear panel 22r with an aesthetically pleasing look and finish about its external perimeter. Correspondingly, the front panel 22f includes a front-right frame member 29, a front-left frame member 30, a front-front frame member 31 and a front-rear frame member 32. Again the front-right, front-left, and front-front frame members 29, 30, 31 may be identical in cross-sectional shape to provide the rear panel 22r with an aesthetically pleasing look and finish about its external perimeter. Regarding the center panel 22c, this panel 22c is provided with a center-right frame member 33, a center-left frame member 34, a center-front frame member 35 and a center-rear frame member 36. Differing from the front and rear panels 22f, 22r, the left and right frame members 34, 35 may be identical in cross-sectional shape says to provide an aesthetically pleasing external perimeter. The remaining frame members 27, 32, 35, 36 of the panels 22r, 22c, 22f constitute portions of the hinge assemblies, discussed below, that interconnect the panels 22 and, accordingly, differ in construction from those frame members discussed above. At the corner intersections of the various frame members 24, corner members 38 interconnect the frame members 24 to one another.

As stated above, the panels 22r, 22c, 22f are pivotably coupled to each other by hinge assemblies 40, 42. In particular, the rear panel 22r is pivotably coupled to the center panel 22c by a first hinge assembly 40, and the center panel 22c is pivotably coupled to the front panel 22f by a second hinge assembly 42. The hinge assemblies 40, 42 are illustrated in detail in FIGS. 2-6. It will be understood that the first and second hinge assemblies 40, 42 are substantially similar to each other and principally differ only in the size of their base components. Accordingly, a description of one hinge assembly is equally applicable to the other hinge assembly, and like components and features are designated with like reference numerals throughout the description and figures. It is further noted that each hinge assembly is a mirror image about the center of the base component. Thus, the description of one half or side of the hinge is equally applicable to the other half or side of the hinge.

The hinge assemblies 40, 42 each include a base 44 and a pair of pivot members, the latter of which are supported on opposing sides of the base 44. The pivot members of the first hinge assembly 40 are the respective front and rear frame members 27, 36 of the rear and center panels 22r, 22c. The pivot members of the second hinge assembly 42 are the respective rear and front frame members 32, 35 of the front and center panels 22f, 22c.

Figure 2A:
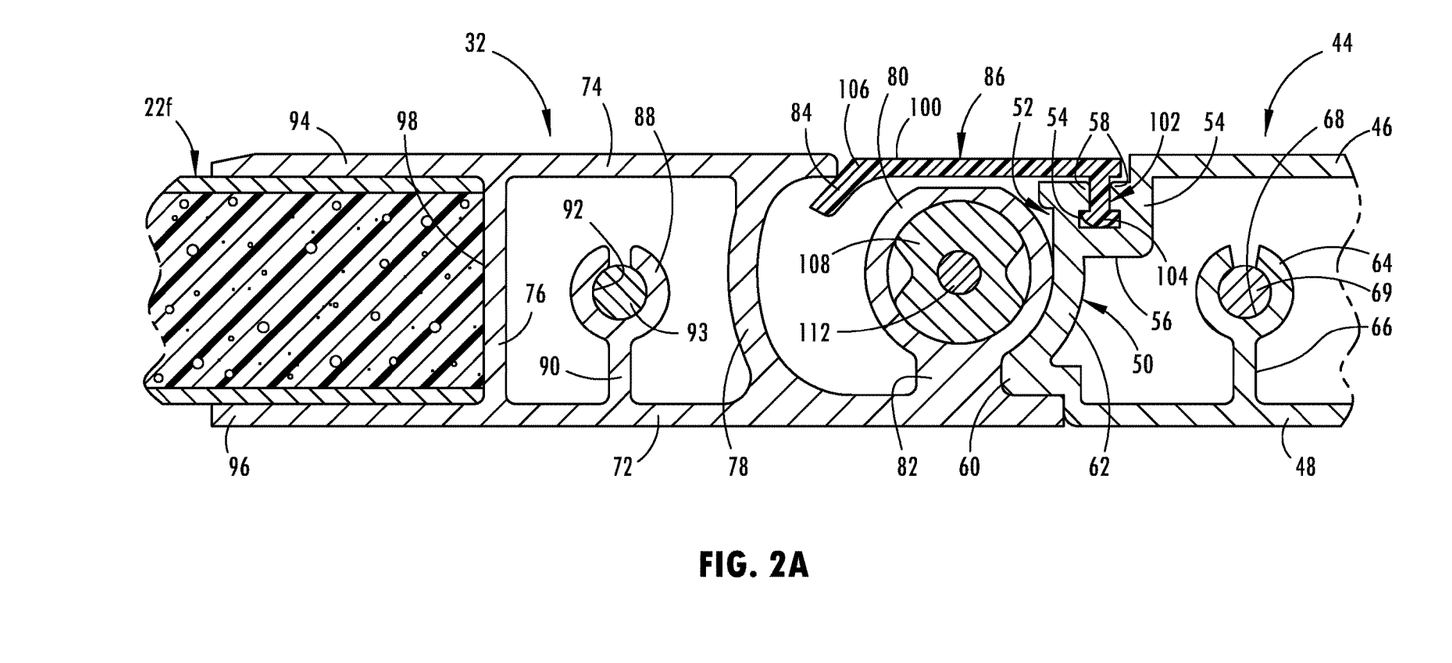
FIG. 2A is an enlarged partial view of half of a hinge assembly, in the fully unfolded position, as generally encircled at 2A in FIG. 2.

With particular reference to FIGS. 2A and 3A, approximately half of the second hinge assembly 42 is shown in an unfolded configuration and a folded configuration, respectively, and is representative of the opposing half of the second hinge assembly 42 as well as approximately half of the first hinge assembly 40. As seen therein, the base 44 includes a top wall 46 and a bottom wall 48 that are disposed substantially parallel to one another. The bottom wall 48 is wider than the top wall 46, and the top wall 46 is generally centered relative to the bottom wall 48. Extending between the top and bottom walls 46, 48 are a pair of side walls 50.

Adjacent to the top wall 46, the sidewalls 50 each include a retainer slot 52. The retainer slot 52 is open in an upward direction and defined by a pair of opposed lateral walls 54 connected by a bottom wall 56. The opening into the retainer slot 52 is further defined by a pair of opposed projections or lips 58 that extend toward one another from the lateral walls 54.

Adjacent to the bottom wall 48, the sidewalls 50 each include a ledge 60. The ledge 60 projects laterally outward from the sidewall 50.

Extending between the retainer slot 52 and the ledge 60, the sidewalls 50 are each provided with an arcuate portion 62. The arcuate portion 62 is outwardly concave and generally merges at its lower end with the ledge 60 and at its upper end with the retainer slot 52, or more specifically the outward lateral wall 54 of the retainer slot 52.

Figure 4:
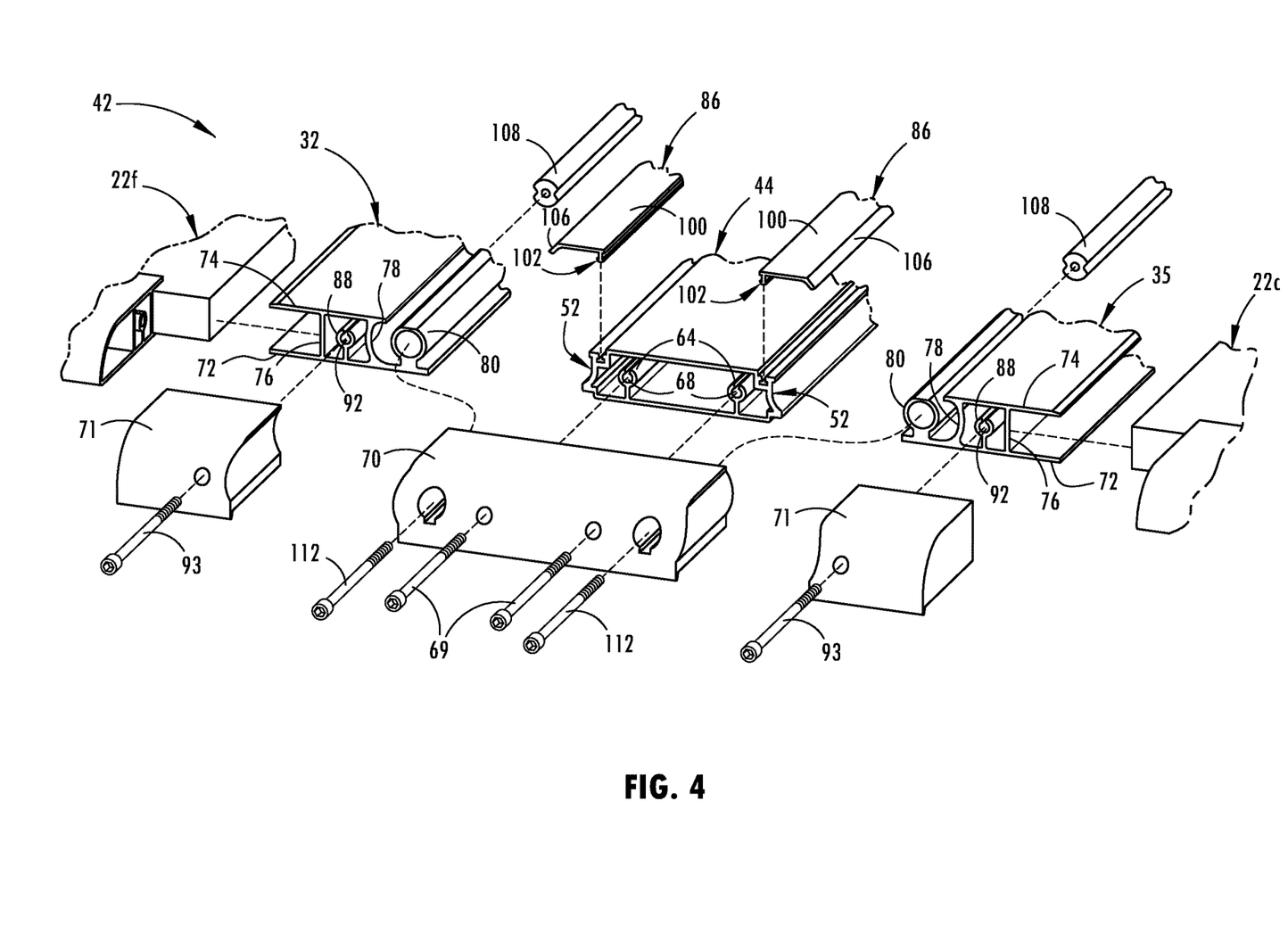
FIG. 4 is an exploded perspective view of one of the hinge assemblies of the tonneau cover seen in FIG. 1.
Figure 5:
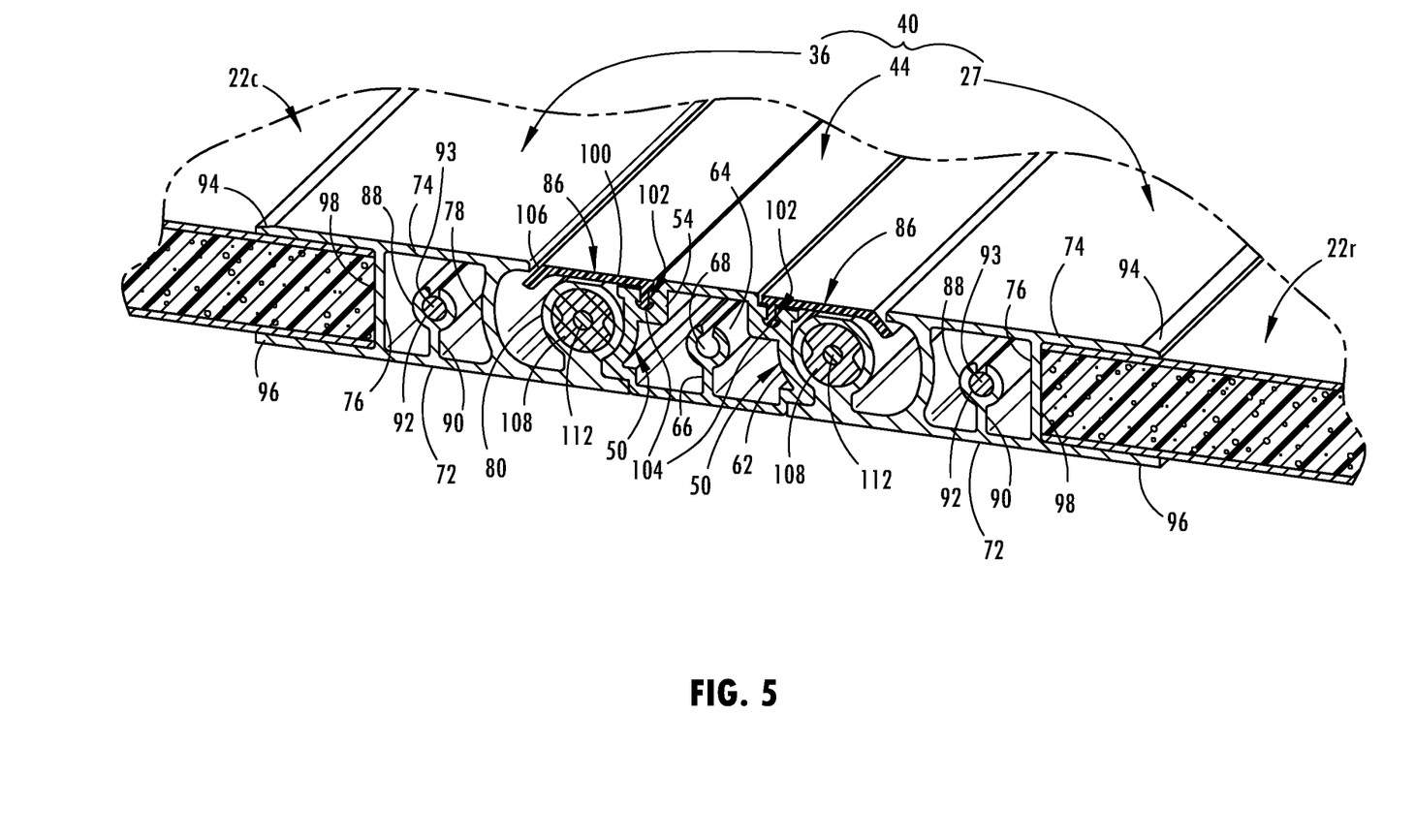
FIG. 5 is a longitudinal sectional view of the hinge assembly, in the unfolded position, generally encircled at 5 in FIG. 2.
Figure 6:
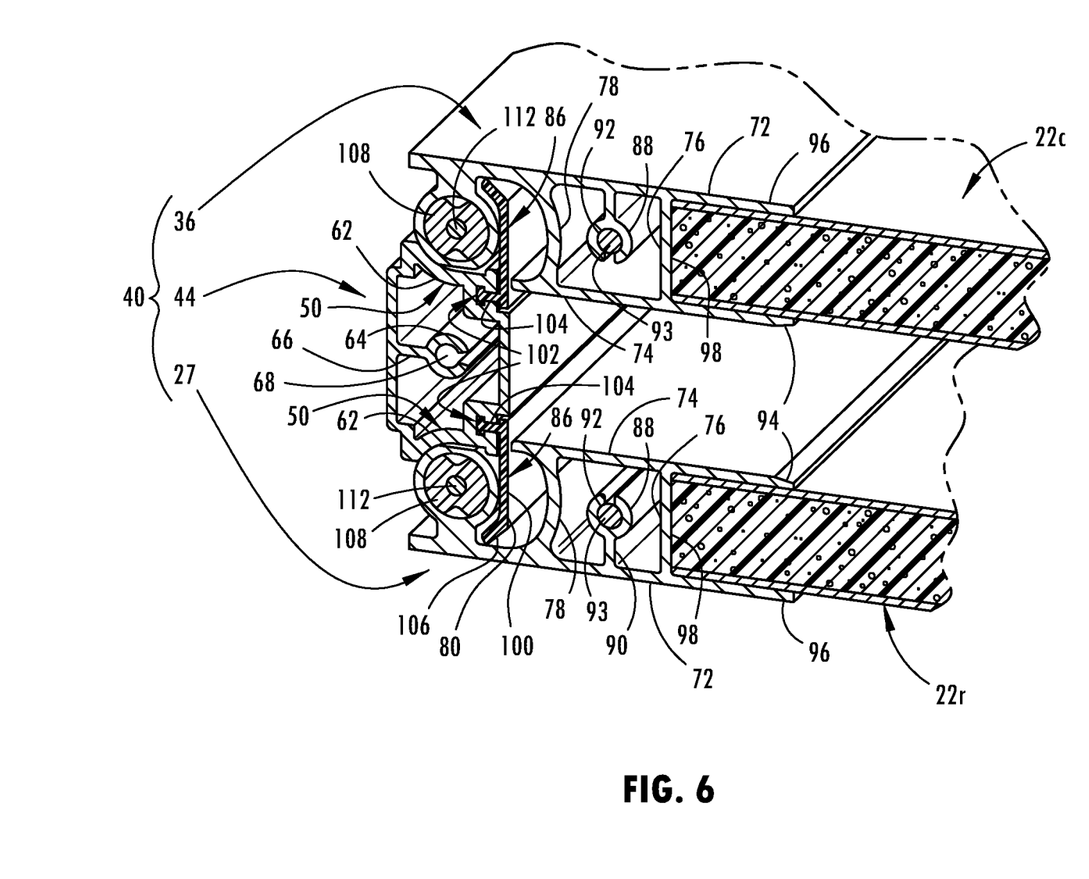
FIG. 6 is a longitudinal sectional view of the hinge assembly, in the folded position, generally encircled at 6 in FIG. 3.

The base 44 additionally includes a boss 64. The boss 64 is disposed interiorly of the base 44, generally between the top wall 46, bottom wall 48 and sidewalls 50, and may be provided with a standoff 66 to more centrally locate the boss 64 between the top and bottom walls 46, 48. The boss 64 is preferably a circular structure with a central opening 68 configured to receive a fastener 69 for securing an end cap 70, which is further discussed below. As seen in FIGS. 2, 3 and 4, the second hinge assembly 42 includes a pair of bosses 64 extended from the bottom wall 48. The first hinge assembly 40, seen in FIGS. 2, 3, 5 and 6, being narrower in width than the second hinge assembly 42, includes a single boss 64. While illustrated as being extended from the bottom wall 48 the boss(es) 64 may alternatively extend from the top wall 46.

As noted above, the pivot members of the hinge assemblies 40, 42 are the front and rear frame members 27, 36 of the rear and center panels 22r, 22c and the rear and front frame members 32, 35 of the front and center panels 22f, 22c. The pivot members 27, 36, 32, 35 of the hinge assemblies 40, 42 are identically shaped. Accordingly, the description of one pivot member applies to each of the pivot members.

The pivot members, represented by pivot member 32 in FIGS. 2A and 3A, include a bottom wall 72 and a top wall 74. Extending between the top and bottom walls 74, 72 are a straight side wall 76 and an arcuate wall 78. The bottom wall 72 is greater in width than the top wall 74 and extends laterally from the arcuate wall 78 in a direction away from the straight wall 76. Towards the end of this lateral extension, the bottom wall 72 is provided with a cylindrical portion 80. The cylindrical portion 80 is slightly raised from the bottom wall 72 by a standoff 82 such that the center of the cylindrical portion 80 is centered between the top and bottom walls 74, 72. The cylindrical portion 80 is received in the outward concavity of the arcuate portion 62 of the base 44, and the ledge 60 of the base 44 is received adjacent to the standoff 82 at a location above the bottom wall 72.

The top wall 74 also extends laterally from the arcuate wall 78 in a direction away from the straight wall 76. The lower, inner edge of this lateral extension is preferably provided for engagement with a seal 86, which is further discussed below.

The pivot member 32 additionally includes a boss 88 is disposed interiorly between the top wall 74, bottom wall 72, straight sidewall 76 and arcuate sidewall 78. As with the previously described boss 64, the boss 88 may be provided with a standoff 90 to more centrally locate the boss 88 between the top and bottom walls 74, 72. Again, the boss 88 is preferably a circular structure with a central opening 92 configured to receive a fastener 93 for securing an end cap 71.

Extending laterally from both the top and bottom walls 74, 72, in a direction opposite from both of the previously discussed lateral extensions of those walls, are projections 94, 96. The projections 94, 96, in conjunction with the straight sidewall 76, define a channel 98. The channel is configured to receive and support an end of a panel 22. The end of the panel 22 is preferably retained in the channel by adhesive, but could be retained by other well know securement methods, including mechanical means.

The seal 86 is generally planar and includes a main face 100 that, when installed, is substantially flush with top wall 46 of the base 44. Formed adjacent to a lateral edge of the main face 100 is a retention rib 102. The retention rib 102 extends from a lower surface of the main face 100 and is received within the retainer slot 52 of the base 44. To prevent the retention rib 102 form separating from the base 44, the distal end of the retention rib 102 is provided with an enlarged head 104. The width of the head 104 is greater than the width of the gap between the opposing lips 58 of the retainer slot 52. To install the retention rib 102 in the retainer slot 52, the retention rib 102 may either be slid axially into the slot 52 or pressed downward forcing the head 104 through the gap between the lips 58 and into the slot 52. Formed on the opposing lateral edge of the main face 100 is an angled or sealing face 106. The sealing face 106 engages at least one of the top wall 74 or arcuate wall 78, and preferably both. As seen in the figures, an outer surface of the sealing face 106 engages the lower edge of the lateral extension of the top wall 74 and a terminal end of the sealing face 106 extends below that lateral extension, generally adjacent to the arcuate wall 78.

As seen in the exploded view of FIG. 4 and the cross-sectional views of FIGS. 2A and 3A, pivot pins or axles 108 are received within the central opening of the cylindrical portion 80. The pivot pins 108 are provided with a length such that they extend from the ends of the cylindrical portion 80, and therefore the ends of the pivot/frame members 27, 32, 35, 36. Accordingly, the pivot pins 108 may have a length greater than the pivot/frame members 27, 32, 35, 36 such that each pivot pin 108 extends from both ends of the pivot/frame members 27, 32, 35, 36, or one pivot pin 108 may be provided in each end of the pivot/frame members 27, 32, 35, 36 and only extend partially therethrough. The pivot pins 108 define the axes of relative rotation between the base 44 and the pivot/frame members 27, 32, 35, 36.

The extended end of the pivot pins 108 engages with a receptacle 110 correspondingly formed on the inside of the end cap 70 and is secured thereto by a fastener 112 or other engagement member, such as a friction fit pin, rivet, etc. that extends into a center opening of the pivot pin 108. The end cap 70 is also secured to the base 44 by a similar fastener 112 or other engagement member that extends into the central opening 68 of the boss 64.

Constructed and engaged in the above described manner, the unfolded tonneau cover 10 of FIG. 2 is moved into the folded position of FIG. 3 by rotating the base of 44 of the first hinge ninety degrees about the pivot pin 108 of frame member 36 and then rotating the panel 22r and frame member 28 ninety degrees about the base 44 and the pivot pin 108 engaged with frame member 28. This results in the panel 22r overlying the panel 22c in a substantially parallel manner. Next, the base of 44 of the second hinge 42 (along with panel 22r lying there over) is rotated ninety degrees about the pivot pin 108 of frame member 32 and then rotating the panel 22c (along with panel 22r) and frame member 35 ninety degrees about the base 44 and the pivot pin 108 engaged with frame member 35. This results in both panel 22c and panel 22r overlying panel 22f in a substantially parallel manner, with panel 22r being located between panel 22c and panel 22d.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tonneau cover for selectively enclosing a cargo box of a pickup truck, the tonneau cover comprising:
    a first panel, a second panel and a hinge assembly, the hinge assembly pivotally connecting the first panel to the second panel, the hinge assembly including
        a first pivot member fixed to an edge of the first panel, the first pivot member including a first cylindrical portion within which a first pivot pin is rotatably received, the first cylindrical portion being continuous along the length of the first pivot member;
        a second pivot member fixed to an edge of the second panel, the second pivot member including a second cylindrical portion within which a second pivot pin is rotatably received, the second cylindrical portion being continuous along the length of the second pivot member; and
        a base member positioned between the first and second pivot members, the base member being connected to the first and second pivot pins so as to be pivotally moveable relative to the first and second pivot members; and
    whereby the base member is pivotable relative to the second pivot member, and the first pivot member and first panel are pivotable relative to the base member such that the first panel is foldable into a position where the first panel overlies the second panel.

2. The tonneau cover according to claim 1, wherein the first and second pivot pins respectively extend a full length of the respective ends of the first and second panels.

3. The tonneau cover according to claim 1, wherein the base member is fixedly connected to the first and second pivot pins.

4. The tonneau cover according to claim 1, wherein the first and second panels are rigid.

5. The tonneau cover according to claim 1, further comprising a third panel and a second hinge assembly, the second hinge assembly pivotally connecting the third panel to the second panel.

6. The tonneau cover according to claim 5, wherein the second hinge assembly includes
    a third pivot member fixed to an edge of the second panel, the third pivot member including a third cylindrical portion within which a third pivot pin is received;
    a fourth pivot member fixed to an edge of the third panel, the fourth pivot member including a fourth cylindrical portion within which a fourth pivot pin is received; and
    a second base member positioned between the third and fourth pivot members, the second base member being connected to the third and fourth pivot pins so as to be pivotally moveable relative to the third and fourth pivot members; and
    whereby the second base member is pivotable relative to the fourth pivot member and the third pivot member and second panel are pivotable relative to the second base member such that the first and second panels are foldable into a position where the first and second panels overlie the third panel.

7. A tonneau cover for selectively enclosing a cargo box of a pickup truck, the tonneau cover comprising:
    a first panel, a second panel and a hinge assembly, the hinge assembly pivotally connecting the first panel to the second panel, the hinge assembly including
        a first pivot member fixed to an edge of the first panel, the first pivot member including a first cylindrical portion within which a first pivot pin is received, the first cylindrical portion being continuous along the length of the first pivot member;
        a second pivot member fixed to an edge of the second panel, the second pivot member including a second cylindrical portion within which a second pivot pin is received, the second cylindrical portion being continuous along the length of the second pivot member; and
        the first and second pivot pins extend from respective ends the first and second cylindrical portions;
        a base member positioned between the first and second pivot members, the base member being connected to the first and second pivot pins so as to be pivotally moveable relative to the first and second pivot members; and
    whereby the base member is pivotable relative to the second pivot member, and the first pivot member and first panel are pivotable relative to the base member such that the first panel is foldable into a position where the first panel overlies the second panel.

8. A tonneau cover for selectively enclosing a cargo box of a pickup truck, the tonneau cover comprising:
    a first panel, a second panel and a hinge assembly, the hinge assembly pivotally connecting the first panel to the second panel, the hinge assembly including
        a first pivot member fixed to an edge of the first panel, the first pivot member including a first cylindrical portion within which a first pivot pin is received, the first cylindrical portion being continuous along the length of the first pivot member;

a second pivot member fixed to an edge of the second panel, the second pivot member including a second cylindrical portion within which a second pivot pin is received, the second cylindrical portion being continuous along the length of the second pivot member;

a base member positioned between the first and second pivot members, the base member being connected to the first and second pivot pins so as to be pivotally moveable relative to the first and second pivot members, the base member being connected to the first and second pivot pins at a common end of the base member; and whereby the base member is pivotable relative to the second pivot member, and the first pivot member and first panel are pivotable relative to the base member such that the first panel is foldable into a position where the first panel overlies the second panel.

9. A tonneau cover for selectively enclosing a cargo box of a pickup truck, the tonneau cover comprising:

a first panel, a second panel and a hinge assembly, the hinge assembly pivotally connecting the first panel to the second panel, the hinge assembly including a first pivot member fixed to an edge of the first panel, the first pivot member including a first cylindrical portion within which a first pivot pin is received;

a second pivot member fixed to an edge of the second panel, the second pivot member including a second cylindrical portion within which a second pivot pin is received; and a base member positioned between the first and second pivot members, the base member being connected to the first and second pivot pins so as to be pivotally moveable relative to the first and second pivot members, the base member being pivotable relative to the second pivot member, and the first pivot member and first panel being pivotable relative to the base member such that the first panel is foldable into a position where the first panel overlies the second panel, and an end cap connecting the base member to both the first and second pivot pins.

10. The tonneau cover according to claim 9, wherein the end cap is fixedly engaged to the base member.

11. The tonneau cover according to claim 9, wherein the end cap is fixedly engaged to the first and second pins.

12. A tonneau cover for selectively enclosing a cargo box of a pickup truck, the tonneau cover comprising:

a first panel, a second panel and a hinge assembly, the hinge assembly pivotally connecting the first panel to the second panel, the hinge assembly including a first pivot member fixed to the first panel, a second pivot member fixed to the second panel, a base member positioned between the first and second pivot members and being pivotally moveable relative to the first and second pivot members, the base member being pivotally connected to at least one of the first and second pivot members by a pivot connection, the pivot connection including a cylindrical portion, a pivot pin received internally of the cylindrical portion and an end cap connected to the pivot pin, the cylindrical portion being integral with of one of the base member and the first or second pivot members, and the end cap being fixedly connected to the other of the base member and the first or second pivot members; and whereby the base member is pivotable relative to the second pivot member and the first pivot member and first panel are pivotable relative to the base member such that the first panel is foldable into a position where the first panel overlies the second panel.

13. The tonneau cover according to claim 12, wherein the pivot pin is fixedly connected to the end cap.

14. The tonneau cover according to claim 12, wherein the cylindrical portion is unitarily formed with one of the base member and the first or second pivot members.

15. The tonneau cover according to claim 12, wherein the pivot connection includes a second cylindrical portion, a second pivot pin received internally of the second cylindrical portion, the second pivot pin being connected to the end cap.

16. The tonneau cover according to claim 15, wherein the second cylindrical portion is integral with of one of the base member and the other of the first or second pivot members.

17. The tonneau cover according to claim 15, wherein the second cylindrical portion is unitary with of one of the base member and the other of the first or second pivot members.

18. The tonneau cover according to claim 15, wherein the second pivot pin is fixedly connected to the end cap.

\* \* \* \* \*